Figure 1:
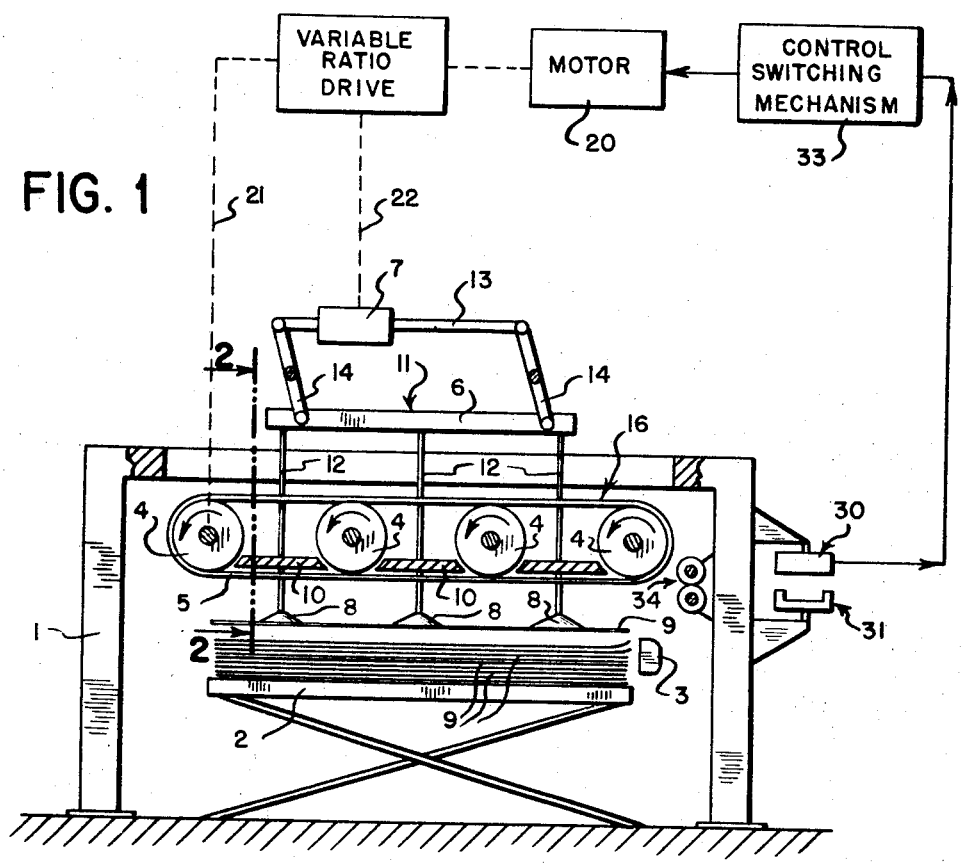

Nov. 5, 1968     P. GRAUX     3,409,149
APPARATUS FOR REMOVING FERROMAGNETIC SHEETS SINGLY FROM A STACK
Filed Aug. 24, 1966

INVENTOR
Pierre Graux
BY *Pennie, Edmonds,*
*Morton, Taylor and Adams*
ATTORNEYS

United States Patent Office 3,409,149
Patented Nov. 5, 1968

3,409,149
APPARATUS FOR REMOVING FERROMAGNETIC
SHEETS SINGLY FROM A STACK
Pierre Graux, Paris, France, assignor to Compagnie du Filage des Metaux et des Joints Curty (Cefilac), Paris, France, a French company
Filed Aug. 24, 1966, Ser. No. 574,631
Claims priority, application France, Aug. 25, 1965, 29,375
5 Claims. (Cl. 214—8.5)

The present invention relates to a method and apparatus for handling ferromagnetic sheets. It is an object of the invention to provide an improved method and apparatus for removing such sheets one by one from a stack at a first location and transferring them to a second location.

Metallic sheets are usually delivered to the fabricating or consuming industries in relatively large and heavy packages. The picking up of these sheets one by one to deliver them to the machines which are to fabricate or process them has heretofore been effected by only partly automated methods because of the many problems which must be resolved in an entirely automatic system. The thickness of the sheets, their shape and dimensions all vary over wide limits. The same is true with respect to their composition, magnetic permeability and surface state. Moreover, the requirements concerning the orientation with which the sheets are to be presented to the fabricating or processing machines also vary widely. This is particularly true as to the speed with which the sheets are to be fed and the spacing or separation between successive sheets.

The present invention provides an automated machine for unstacking flat magnetic objects such as sheets and for delivering them one by one to a fabricating or processing machine under optimum conditions. Its capacity is limited only by the relation of its own power to the dimensions and weight of the sheets handled and to the maximum speed of their delivery, not by the qualities of the sheets themselves.

Hereinafter, the end or edge of a sheet nearest the machine toward which the sheet is being delivered will be identified as the downstream end thereof.

The machine of the invention comprises essentially:

(a) An elevator table which brings the uppermost sheet of the stack within the range of operation of a movable sheet pickup device, (b) Means to control automatically the rise of this table, (c) A so-called fanner which separates the uppermost sheets in the stack from each other at their downstream edges, (d) A movable sheet pickup device including magnetic or vacuum-operated elements for grasping the uppermost sheet of the stack and lifting it parallel to itself, (e) Means to shift the pickup device from a low vertical speed on initial pickup to a higher vertical speed for subsequent lift of the sheet, (f) A magnetic sheet transporting device including at least two rows of continuously driven horizontal rollers extending transversely of the length of those rows and beneath which the pickup device brings the sheets one at a time, (g) Means to detect and discriminate the presence of none, one or more than one sheet beneath the transport device and to stop the machine if two are present or to initiate a new descent of the pickup device if none are present, and (h) Means to adjust the separation of the sheets lengthwise of their travel under influence of the transport device.

The elevator table constitutes the support for the stack of sheets. It possesses a vertical motion, desirably of intermittent form. When the aggregate thickness of the sheets which have been lifted off of the stack is such that the upper level of the stack is no longer within the range of operation of the pickup device, the table will rise by an amount not more than the effective height of this range, thus making it possible again to withdraw sheets with the table stopped. This elevating operation of the table may be controlled, for example, by means of a photoelectric cell disposed above the stack, the luminous beam to which the cell responds being cut off from the cell by the stack of sheets when the top of the stack is at the proper height. After withdrawal of a certain number of sheets the beam is uncovered and the cell delivers a starting signal to a jack screw for lifting of the table. The table may be provided with mechanical rollers which facilitate the placing of a new load of sheets thereon.

The fanning devices are preferably disposed adjacent the downstream edge of the upper part of the stack. They operate magnetically. If desired, there may be provided in conjunction therewith air nozzles which inject compressed air between the edges of sheets which will have been separated one from another by the magnetically operating fanning device or devices. The fanning devices may be of any desired and known type. However, it is known that the usual fanning devices are more effective in proportion to their power but that in contrast the friction between the edges of the sheets and these devices becomes more and more troublesome in that proportion. In a preferred form of the invention there is employed a fanning device operating on the principle of flux switching which makes it possible to annul the magnetic flux of a magnetic circuit by energizing an electrical coil suitably disposed in the associated electrical circuit. In the present invention, the field of the fanning device is annulled at the time when the pickup device begins to slide the edge of the sheet being lifted over the face of the fanner.

The pickup device may, for example, comprise a frame provided with upward and downward motion and to which are fastened the active elements for grasping the sheet. These may be suction cups or magnetic rollers of small diameter and shallow field mounted to rotate freely on their axes. In one embodiment of the invention the movement of this frame is controlled by a cam suitably coupled to the shaft of the motor which drives the rollers of the transport device, a variable ratio drive being interposed in order to compensate for variation in the length of the sheets. In another embodiment of the invention the frame is moved by means of a jack screw; the lowering of the frame by means of this screw is controlled by a contact having controllable delay elements disposed therein and disposed at a suitable distance vertically above the front or downstream edge of the sheets, either movably on a horizontal rail or at a fixed position. The rise of the frame by means of the jack screw is controlled by means of a limit stop disposed at the bottom of the travel. This embodiment has the advantage of preserving a predetermined constant separation between the sheets whatever may be their shape and speed. This is true because this separation depends only on the round trip time of the jack screw on the position of the first contact. The use of a rigid frame having sheet-grasping components disposed to engage the sheet at points distributed over the whole surface of the sheet is advantageous especially when it is desired to lift the sheets parallel to themselves without having the sheets slide on each other with consequent danger of scratching. The heavy mass of this movable structure may advantageously be balanced in order to permit high operating speeds.

One especially desirable feature of the pickup device according to the invention resides in its two-phase mode of operation. In order to insure a dependable grasping of the uppermost sheet of the stack without excessive stress imposed on the magnetic rollers or suction cups, the initial part of the rise of the frame is carried out slowly. When after a short time the sheet has been dependably separated from the stack, a change in the speed of rise occurs and the remainder occurs rapidly until the sheet is delivered to the horizontal transport device. This construction improves the dependability with which the sheets are seized without substantially increasing the total time for withdrawal of one sheet. Moreover, it makes it possible to employ a moderate pickup power whereas if operation were conducted in a single-phase manner it would be necessary to have a larger reserve power so as to pull off the uppermost sheet at vertical speed high enough to be compatible with an acceptable time for the complete operation.

When suction cups are employed it is advantageous to interpose a vacuum reservoir vessel between the pump and the suction cups.

The horizontal sheet transport device preferably comprises two or more parallel rows of rollers of magnetic material which rotate continuously and which extend transversely of the rows in which they are respectively disposed. This transport device is supported on the frame of the machine. In one embodiment these rollers are covered with a coating of rubber. This is desirable because when the rollers come into contact with the sheet they impose an acceleration on the sheet, by friction between the rollers and the sheet, in the course of which the sheet may be scratched. In another embodiment an endless rubber belt passes over the rollers. In all embodiments the motion of the sheet is made uniform by a series of pinch rollers whose rotation is subject to control and which are disposed downstream of the transport device.

Customarily the machine to which the sheets are to be fed will not accept at any one time more than the thickness of one sheet. However, two sheets may accidentally be fed together from time to time if the sheets are oily and difficult to separate. This may also occur in the event of malfunction of the apparatus which controls as a function of position the grasping action of the pickup device especially if the sheet-grasping elements of that device are magnetic. In the event of such a double pickup it will be necessary to stop the machine. The invention provides means which prevent such double pickup of sheets. These means may include, for example, a flux meter exposed to the action of a magnet, the flux meter and magnet being carried by the frame, in front of this one with the flux meter on one side and the magnet on the other side of the position of a sheet carried by that device. The means to prevent double pickup of sheets may also operate with the aid of light-beam-responsive elements.

The control and safety devices of the machine make up a sequencer comprising detectors, transducers, relays and hydraulic valves. It may be electric, pneumatic, or hydropneumatic in nature, or it may operate by a mixture of such means.

Figure 2:
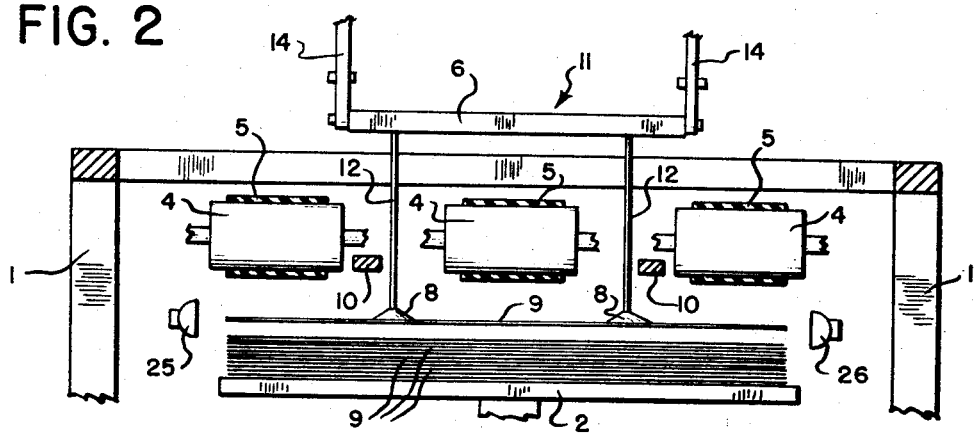

The invention will now be further described in terms of a presently preferred embodiment and practice thereof and with reference to the accompanying drawings in which FIG. 1 is a diagrammatic view in side elevation of an unstacking machine according to the invention, and FIG. 2 is a fragmentary sectional view taken on the line 2—2 of FIG. 1.

Referring to FIG. 1, the machine shown in the drawings comprises a frame 1 fastened to the floor and an elevator table 2. A magnetic fanning device 3 is disposed adjacent the downstream edge of the stack. Compressed air nozzles, not shown in the drawing, may be provided adjacent the fanning device for operation in conjunction therewith and there may be a plurality of the devices 3 disposed side by side.

The machine further comprises a pickup device generally indicated at 11. The function of this device is to grasp the uppermost sheet of the stack and to lift it in a substantially vertical direction for delivery to a transport device generally indicated at 16 by means of which that sheet will be transferred to a second location, laterally removed from the stack. The pickup device 11 includes a horizontal metallic frame 6 which may be of hollow rectangular shape. This frame, shown in FIGS. 1 and 2, is raised and lowered by four arms 14 which are driven by two pneumatically operated jack screws 7 of which only one is visible in FIG. 1. The arms 14 of the pickup device are pivoted at their upper ends to stationary horizontal bars 13 and at their lower ends to the frame 6. Rotation of the arms 14 counterclockwise in FIG. 1 lifts the frame 6, first slowly and then more rapidly. The sheet-gripping elements, which in the embodiment illustrated take the form of suction cups 8, are fastened by tensile members 12 to and depend from the frame 6. They are connected via pneumatic lines not shown to a source of vacuum or subatmospheric pressure. This source may, for example, include venturi-type ejectors acting on compressed air, and a vacuum storage vessel may be inserted into the pneumatic circuit leading to the suction cups in order to maintain a substantially constant negative pressure there.

The suction cups 8 grasp the uppermost sheet of the stack and hold it while it is being lifted, by operation of the frame 6, until that sheet is taken over by the horizontal transport device 16 for horizontal motion away from the stack. Preferably as is indicated in FIGS. 1 and 2, the suction cups are disposed in an array providing gripping points or areas on the sheet disposed over substantially the entire area thereof. Thus in the example illustrated, the suction cups are disposed in rows extending lengthwise and transversely of the sheet 9 being lifted.

The machine illustrated in the drawings also comprises a motor driven horizontal transport device generally indicated at 16. This device includes at least two rows of rollers 4 of magnetic material disposed on parallel horizontal axes. In the embodiment illustrated there are three such rows, the suction cups 8 engaging the sheet between the outermost and the middle ones of these three rows of rollers. The rollers 4 are supported on shafts which are affixed to elements of structure not shown belonging to frame 1 of the machine. They are thus fixed in position. At least one roller in each of the rows is driven to rotate counterclockwise in the view of FIG. 1, and all of the rollers 4 are coupled together for rotation in the same direction. This may be effected by means of conveyor belts 5, one for each of the rows of rollers. If desired, the rollers may be of barrel shape so as to prevent lateral creep of the conveyor belts. One or more magnetic rails 10 may be provided extending lengthwise of the rows of the rollers and positioned immediately above the lower course of the conveyor belts to stabilize the ends of the sheet as it is moved to the right in FIG. 1 by the rollers 4.

The pickup device 11 and horizontal transport device 16 are desirably driven from a common source of power shown diagrammatically in FIG. 1 as a motor 20. The motor 20 is coupled to the rollers 4 by means of a linkage diagrammatically indicated at 21 and to the jack 7 which drive the arms 14 of the pickup device by means of a linkage diagrammatically indicated at 22. The linkages 21 and 22 connect to the motor 20 through a variable ratio drive 23. This device makes it possible to alter the linear motion effected by the lower course of the belts 5 during a single complete up and down motion cycle of the pickup device 11, as is desirable to provide proper spacing between successive sheets of varying sizes as delivered by the apparatus shown in the drawings to the process machine or other station to which the sheets are transferred.

It will be clear from FIG. 2 that with rotation of the arms 14 the pickup devices 8 will lift the sheet 9 taken from the top of the stack into contact with the lower course of the belts 5. With further rotation of the arms 14 the suction cups 8 will disengage from the sheet 9. The sheet is however now within the effective magnetic field of the rollers 4 and rails 10 and is retained by them against falling.

The elevating operation of the table 2 is controlled in the embodiment illustrated by means of a light source 25 which focuses a beam onto a photoelectric cell diagrammatically indicated at 26, these elements being so supported on the frame 1 that the beam from the source 25 to the cell 26 is obscured if, and only if, the top sheet of the stack is above a minimum level. The output signal from the photocell is coupled to the control mechanism for the drive of the elevator table so as to cause energization of that drive when the photocell is illuminated, the table being thus lifted through a predetermined suitable amount.

The advancing sheets are engaged between the pinch rolls 34 which draw them along. On the FIG. 1 is also illustrated diagrammatically a flux meter 30 and a magnet 31, both depending from the frame 1 and in front of this one in the direction of the transport. The flux sensed by the meter 30 possesses three distinct values according as no sheet, one sheet or more than one sheet are engaged between the magnet and the meter. With such an arrangement of the meter the emergency stopping control unit must act quickly or a sufficient interval must be provided between the unstacking machine and the processing machine. These discriminable states of the flux meter output are employed via a switching mechanism 33 controlling motor 20 respectively to reverse the upward motion of the frame 6, to permit continued rise of the frame 6, and to stop the machine. Thus the frame 6 is sent back down if no sheet has been picked up and is allowed to rise so as to transfer the sheet to the transport device 16 if a single sheet has been picked up, whereas the machine is stopped if two or more sheets have been picked up.

It will thus be seen that the cycle of the machine includes an initial or stopped position in which the frame 6 of the pickup device is in its uppermost position with the vacuum to the suction cups cut off. In operation there then follows descent of the frame with its suction cups, the vacuum being applied only shortly before the suction cups come into contact with the uppermost sheet of the stack. An initial slow rise of the suction cups is then followed by a rapid rise as soon as the uppermost sheet has been definitively separated from the stack. The vacuum is then cut off just before the sheet is taken under control by the belts. Lastly, the frame returns to its initial position.

Motion of the frame is controlled by up and down limit switches, a sheet feeler on the frame which follows the motion of the cups, and an approach detector disposed on the mobile frame. The frame 6 descends until the feeler touches the top sheet. The frame then rises to its uppermost position unless the detector indicates that no sheet has been lifted, in which event the frame will immediately descend again. In the event a sheet has been lifted from the stack, the frame descends again as soon as this sheet, having been moved away by the transport device 16, no longer actuates the detector.

The vacuum circuit for the suction cups is controlled by another set of limit switches mounted on the frame. Thus this device effects the application of vacuum to the suction cups on descent of the frame and the return of atmospheric pressure thereto when the frame rises. The timing is such that the vacuum is applied to the suction cups just before they come into contact with the sheet and is removed when the separated sheet comes into the range of operation of the magnetic field of the rollers 4 and of the transport device 16.

While the present invention has been described herein in terms of a presently preferred embodiment of the apparatus thereof and in terms of the presently preferred practice of the method thereof, the invention itself is not limited thereto but rather comprises all modifications on and departures from that embodiment and presently preferred practice properly falling within the spirit and scope of the appended claims.

I claim:
1. Apparatus for transferring magnetic sheets from a first location to a second location comprising:
   (a) an elevator table for support of a stack of sheets,
   (b) means to control automatically the rise of said table to maintain the uppermost sheet of a stack thereon between upper and lower limits of height,
   (c) means to separate the uppermost sheet in the stack from the next lower sheet along at least part of the edge thereof,
   (d) means to grasp a sheet,
   (e) means to move said grasping means between an upper position and a lower position, said lower position being above said table and vertically adjacent said lower limit, said moving means having during upward travel a low vertical speed at said lower position and a higher vertical speed at higher vertical positions,
   (f) a magnetic sheet transporting means including a plurality of rows of horizontal rollers extending transversely of their respective rows, the lower surface of said rollers lying between said upper and lower positions,
   (g) drive means coupled to said transporting means and to said moving means,
   (h) a variable ratio coupling interposed between said drive means and at least one of said transporting means and moving means,
   (i) means to develop a signal in response to the simultaneous delivery of more than one sheet by said transporting means, and
   (j) means responsive to said signal to stop said drive means.

2. Apparatus according to claim 1 wherein said grasping means comprise suction cups.

3. Apparatus according to claim 1 wherein said separating means are disposed along the downstream edge of the stack in the sense of motion of the sheet under influence of said transporting means.

4. Apparatus according to claim 1 wherein said separating means operate by magnetic flux switching.

5. Apparatus according to claim 1 wherein said moving means include a jack screw.

References Cited

UNITED STATES PATENTS 2,661,948  12/1953  Montgomery _____ 214
2,999,687   9/1961  Hommel _____ 214—18.1
3,067,885  12/1962  Kohler _____ 214—8.5

HUGO O. SCHULZ, *Primary Examiner.*

G. F. ABRAHAM, *Assistant Examiner.*